Sept. 10, 1968    I. C. CHEETHAM    3,400,571
APPARATUS FOR THE MEASUREMENT OF INTERNAL FRICTION OF MATERIALS
Filed Dec. 6, 1965    2 Sheets-Sheet 1

United States Patent Office 3,400,571
Patented Sept. 10, 1968

3,400,571
APPARATUS FOR THE MEASUREMENT OF INTERNAL FRICTION OF MATERIALS
Ivan Clifford Cheetham, Upper Longdon, England, assignor to Dunlop Rubber Company Limited, London, England, a British company
Filed Dec. 6, 1965, Ser. No. 511,938
Claims priority, application Great Britain, Dec. 10, 1964, 50,244/64
14 Claims. (Cl. 73—9)

ABSTRACT OF THE DISCLOSURE

An apparatus for measurement of internal friction of materials and particularly the hysteresis loss in polymers over a substantial temperature range. The specimen to be measured comprises a thin annulus adhered to a plate supporting a heating bath and lies in contact with a plurality of balls which are supported on a rotatable track plate. The balls are constrained to rotate around the track plate in equally-spaced-apart relationship by means of a metal spider, the end of each arm of the spider being bifurcal the balls being located in the bifurcate portions of the arms. The bifurcate portions of the spider arms are coated in polytetrafluoroethylene to substantially eliminate friction between the balls and the arms of the spider. The balls are restricted in radial movement by a groove in the track plate. The torque generated by rotation of the track plate is transmitted to the specimen via the balls and when measured represents the internal friction of the material of the specimen.

---

This invention relates to apparatus for the measurement of internal friction of materials.

Apparatus is already known for the measurement of internal friction (hysteresis loss) in elastomeric materials throughout a large range of temperatures in order to obtain information of an analytical and physical nature in respect of the material undergoing measurement, but the apparatus has been unable to measure these characteristics over a wide temperature range, and particular variations in temperature of the specimens has been accompanied by temperature variation of parts of the apparatus which has caused inaccuracy in the measurements obtained.

It is an object of the present invention to provide an improved form of such apparatus.

According to the invention there is provided apparatus for the measurement of internal friction of a material throughout a range of temperature conditions to which the material is subjected comprising two members having opposed surfaces, one such member being a track member having a grooved track formed therein and the other member being a support member for supporting a specimen of the material, the internal friction of which is to be measured, a plurality of balls located between said opposed surfaces and within the track, means for rotating the track member at a predetermined speed, means for rotatably supporting the support member, means for resisting the torque of the support member, means for measuring the resisting torque or the rotational deflection of the support member to obtain the value of the internal friction set up in the specimen material, a reservoir for the reception of means for changing the temperature of the support member located in direct contact therewith, a chamber substantially enclosing the reservoir and the support member and means for measuring the temperature of the specimen.

Preferably the reservoir is for containing liquid nitrogen which, upon evaporation, leaves an extremely cold specimen, readings of internal friction being taken at intervals of, for example, ten seconds during the warming-up period to reach ambient temperature, and heating means are provided within the chamber to warm up the specimen, the temperature of the heating means being controlled so that a gradual increase in specimen temperature is achieved, readings of internal friction again being taken at intervals of, for example, 10 seconds.

Means can be provided for changing the speed of rotation of the member provided with the track, for example, by inserting a further gear train, or by means of a conventional gear box.

Preferably, automatic means are provided for measuring the resisting torque of the support member at intervals comprising a normally freely rotatable contact arm rotatable, together with the support member, over an annular electrical potentiometer, solenoid means being automatically operated at predetermined intervals to clamp the contact arm against the potentiometer to supply a reading to a recorder.

Figure 1:
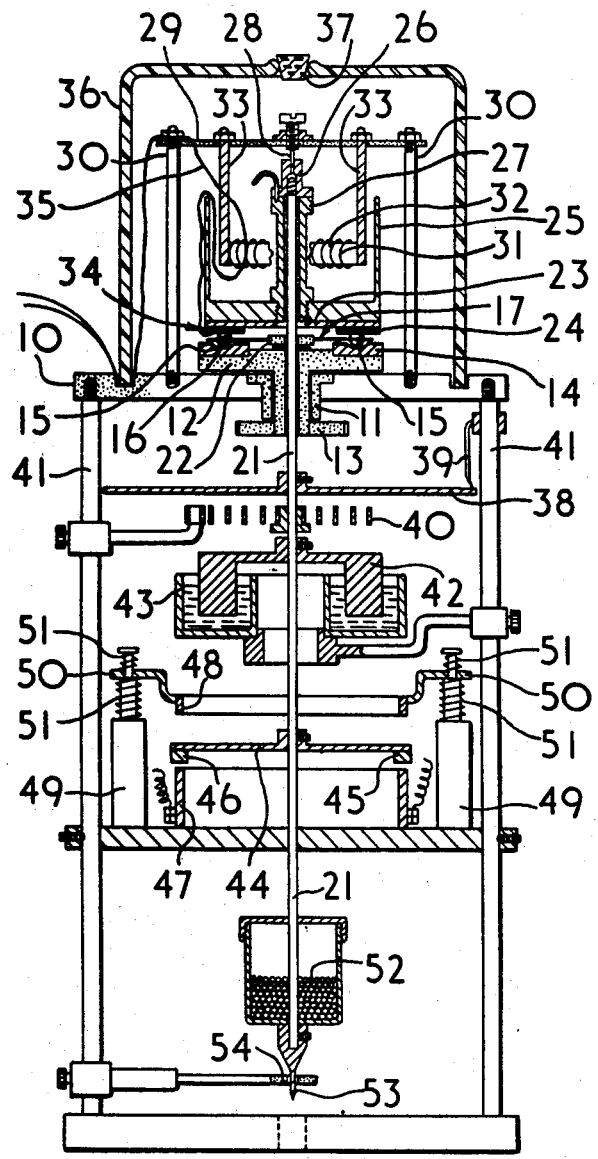
Figure 2:
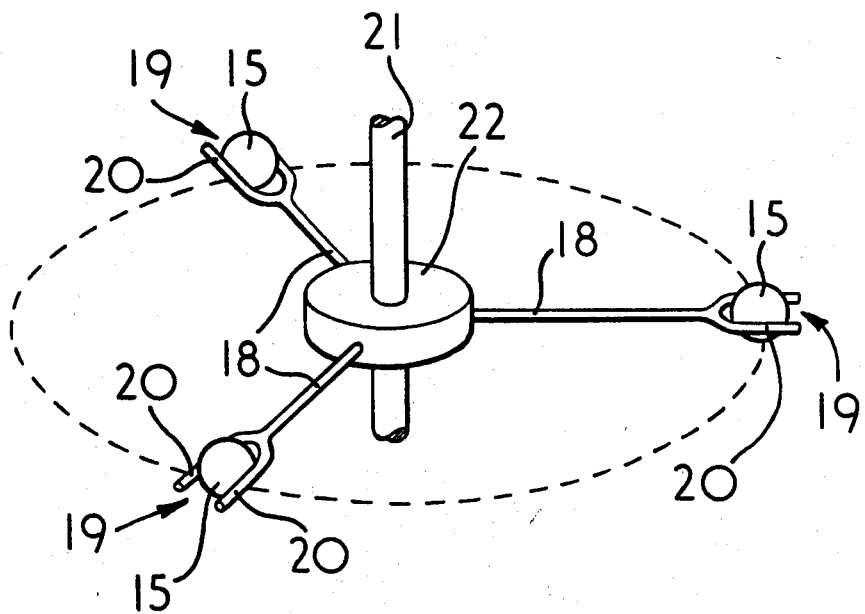

One embodiment of the invention will now be described by way of example, with reference to the accompanying drawings wherein FIGURE 1 shows a front sectional view of the apparatus, and FIGURE 2 shows a perspective detail view of a ball supporting and spacing device.

The apparatus is designed for measurement of hysteresis loss in polymers such as natural and synthetic rubbers, and plasticised polyvinylchloride.

The apparatus comprises, essentially, a rotatably driven first part, and a coaxial second part, rotatable through a limited angle by the torque set-up by hysteresis losses, in a specimen carried by the second part, the energy being supplied by the first part through the medium of rolling balls, driven under load at a predetermined speed against the surface of the specimen.

The apparatus will now be described in more detail, together with its method of operation.

A thermally insulating base plate 10 made of Tufnol (registered trademark) which is a phenol formaldehyde resin impregnated paper, is provided with a sleeve bearing 11 made from Delrin (registered trademark), which is a polyformaldehyde.

Alternatively, the base plate and bearing may be made from polytetrafluoroethylene (p.t.f.e.).

A face plate 12 also made of Delrin (registered trademark) is rotatable in the sleeve bearing 11 by means of an electric motor (not shown), and worm gear and sprocket mechanism 13 drivably connected to the face plate 12. A thrust race is located on the surface of the face plate 12 remote from the base plate 10, the thrust race comprising a stainless steel annular track plate 14 formed with an annular grooved track 16, the apparatus being so designed that the groove 16 of the track plate 14 is rotatable in a horizontal plane. Three steel balls 15, are freely rotatable in the groove 16 of the plate 14, the radius of each of the balls being considerably smaller than the radius of the groove, when considered in cross-section. The three balls 15 are constrained to rotate around the track plate 14 in equally-spaced-apart relationship one to an other, by means of a stainless-steel spider 17, having three arms 18, each provided with a fork 19, within each of which a ball 15 is located, the frictional braking torque applied by the forks 19 to the balls 15 during rotation of the balls and forks, as will later be described, being kept to a very low and negligible level by the provision on each arm of each of the forks, where it contacts a ball, of a p.t.f.e. sleeve 20 cemented by means of an epoxy resin to the arm.

The spider 17 is freely rotatable on a central spindle 21, rotatable independently, and clear of the face plate 12, freedom of rotation being ensured by mounting the spider 17 on the spindle 21 by means of a p.t.f.e. hub 22.

The spindle 21 carries at its upper end, a steel support plate 23 which has a lower surface located in opposition to the track plate 14, to which surface can be adhered a thin annular specimen 24 of the polymer which is to have its internal friction or hysteresis characteristic measured.

An aluminium reservoir 25 of 150 cc. capacity is rigidly secured in direct heat conducting contact to the upper surface of the support plate 23 remote from that to which a specimen 24 may be attached. A needle point bearing 26 is secured coaxially to a central portion 27 of the reservoir, and a needle 28, supported on a plate 29 carried by pillars 30 attached to the base plate 10, is located in the needle point bearing 26 to steady the spindle 21, reservoir 25 and support plate assembly. Also attached to the plate 29 is a heating element comprising coiled electrical resistance wire 31 wound upon an annular former 32 of substantially circular cross-sectional form. The former 32 is located centrally within the reservoir 25 and is supported by suspending rods 33 attached to the plate 29.

An electrical thermo-couple 34, having a long fine flexible lead 35, is located adjacent to the steel support plate 23 for insertion into the body of the specimen 24, in a region closely adjacent to the region of the specimen upon which the balls 15 are caused to rotate in a manner which will be later described.

A transparent glass cover 36, having a small closable hole 37 in its uppermost portion, is located around the face plate 12, support plate 23 and reservoir assembly 25, the small hole 37 being provided to enable liquid nitrogen (temperature minus 190° C.) to be poured, or, alternatively, heated air to be directed into the reservoir 25. The thermo-couple leads 35 are led out of the chamber formed within the glass cover 36 and base plate 10, a thermo-couple cold junction (not shown) being provided.

The spindle 21 extends through the base plate 10, projecting beyond and below it, and is provided with a disc 38 having a scale calibrated in degrees marked adjacent to its outer periphery. A pin 39 is located in a fixed position, adjacent to the scale to enable visual readings to be taken. A spiral spring 40 has one end attached to the spindle 21, below the disc 38, and the other end attached to a fixed member 41 upon which the base plate 10 is supported. The spring 40 provides a torque resistance to rotation of the spindle 21, as will be appreciated from the later part of this description.

Below the spring 40, there is mounted a damping device comprising a multi-bladed paddle wheel 42 secured to the spindle 21, the blades of the paddle wheel being immersed within a fixed oil-filled trough 43 whereby violent rotary fluctuation of the spindle 21 is prevented during operation.

Below the damping device there is mounted a contact arm 44 projecting from diametrically opposite sides of the spindle 21, the contact arm being made from springy metal, provided at one diametrically opposite end with an electric contact 45, and an insulating member 46 at the other. An annular electrical potentiometer 47, is secured in a fixed position coaxially with the spindle 21, and below the electrical contact arm 44, with the contacts 45 driven around the periphery of the potentiometer but normally just clear of its surface. A clamping ring 48 is disposed above the contact arm 14, and is operated, to press down the contact arm 44 to effect electrical connection between it and the potentiometer 47, by means of two electrical solenoids 49 engageable with legs 50 projecting from the ring 48, the legs 50 each being operably connected to the solenoids by means of a pair of springs 51, the weaker spring of the pair for each leg 50 being the spring through which the clamping force is exerted, so as to ensure that clamping of the contact arm 44 to the potentiometer 47 is achieved with light pressure. The potentiometer 47 is provided with a constant voltage supply, and the voltage is tapped-off the potentiometer by the contact arm 44 to be picked up from the spiral spring 40 which is attached to the spindle 21. The calibration of the potentiometer and its location relative to the support member 23 is such that the potential tapped-off by the contact arm 44 is proportional to the resisting torque of the support member. The wiring arrangement is of advantage in the sense that any fouling of the metal members attached to the spindle 21 causes an earthing of the electrical potential supplied through the potentiometer 47, and thus prevents any reading being obtained from the apparatus. This obviates any difficulty which may be set up by a false reading.

A weight 52 is attached to the bottom of the spindle 21 so that the load reaction imposed by each ball 15 upon a specimen 24 is 150 grams and the lower end of the spindle 21 comprises a needle 53 supported in a suitable bearing 54.

Automatic electrical recording apparatus is provided operating to actuate the solenoids 49, once every ten seconds, to obtain a reading of the torque applied to the spindle 21 and thus of the hysteresis loss in the specimen 24, the readings being recorded on a chart in the form of a series of inked dots, so that a plot is obtained of torque against temperature, and thus of hysteresis loss, over the temperature range to which the specimen is subjected.

The operation of the apparatus will now be described in more detail.

The apparatus is set up by applying an annular specimen 24 of 2½ mm. thickness, and about 3 inches diameter, to the steel support plate 23, impact adhesive being used.

The track which the balls 15 will take when rotating around the surface of the specimen 24 is marked on the surface and a small cut is inserted 1 mm. from the outer edge of the track. One junction 34 of the thermocouple is pushed into the cut, and sealed in position with rubber solution, taking care not to foul the track, the support plate 23 and specimen 24 being assembled with the remainder of the apparatus and the thermo-couple, looped to prevent restriction to the rotation of the specimen, is led out to the recording apparatus and to the cold junction.

The glass cover 36 is placed in position, and liquid nitrogen is poured into the reservoir 25 to fill it, and cool it to minus 100° C. or lower.

Most of the moist air initially present in the chamber is forced out by the boiling of the nitrogen, and thus frost formation upon the specimen and on parts of the apparatus is substantially eliminated.

A bung is placed in the hole 37 at the top of the glass cover 36, and the specimen is allowed gradually to warm up during which time rotation of the electric motor drives the face plate 12 at 25 r.p.m. to rotate the balls 15 in their track and around the surface of the specimen 24.

Readings of the torque applied to the spindle 21, resisted by the spiral spring 40 and set up by the hysteresis loss in the specimen, are taken at 10 second intervals when the solenoids 49 are operated to clamp the contact arm 44 against the potentiometer 47, and so obtain a trace upon the recording chart. When the specimen has reached room temperature, the heating coil 31 is energised so that the specimen is gradually heated to an ultimate temperature which may reach 120° C.

Alternatively the specimen may be heated by supplying heated air into the chamber through the hole 37 in the glass cover 36.

Higher temperatures may be reached by designing the apparatus using suitable materials capable of withstanding the required temperature, and by increasing the heat input.

The results which are obtained, show considerable variations of hysteresis loss throughout a temperature range from between minus 100° C. and plus 120° C., most polymers passing through first and second transition temperatures.

It is possible, by means of the apparatus to analyse specimens of rubber, since by a prior knowledge of the hysteresis loss characteristic of polymers, individual polymers can be identified. The apparatus is of a great value, also, in investigating and predicting the performance of new polymers.

While in the apparatus described, the torque applied to the spindle 21 is balanced against a spiral spring 40, in an alternative form of apparatus, the torque is applied to load cells for measurement, and subsequent recording.

It is a great advantage of the apparatus described, that a specimen can be directly cooled and/or heated through a very wide temperature range in a chamber which is thermally insulated from most of the remaining parts of the apparatus.

In a further variation of the apparatus described, the electrical heating element 31 is energised by power from a suitable temperature programming device, capable either of automatically raising the temperature of the specimen stage-by-stage, or of increasing and decreasing the said temperature according to a predetermined temperature programme.

Apart from the wide range of readings obtained, the apparatus has proved to be very reliable in operation, and closely reproducible readings are obtainable.

Having now described my invention, what I claim is:

1. Apparatus for the measurement of internal friction of a material throughout a range of temperature conditions to which the material is subjected comprising two members having opposed surfaces, one such member being a track member having a grooved track formed therein, and the other member being a support member for supporting a specimen of the material, the internal friction of which is to be measured, a plurality of balls located between said opposed surfaces and within the track, means for rotating the track member at a predetermined speed, means for rotatably supporting the support member, means for resisting the torque of the support member, means for measuring the resisting torque or the rotational deflection of the support member to obtain the value of the internal friction set up in the specimen material, a reservoir for the reception of means for changing the temperature of the support member located in direct contact therewith, a chamber substantially enclosing the reservoir and the support member, and means for measuring the temperature of the specimen.

2. Apparatus as claimed in claim 1 wherein heating means are provided for raising the temperature of the specimen.

3. Apparatus as claimed in claim 2 wherein the heating means comprises an electrical heating element located within the reservoir.

4. Apparatus as claimed in claim 1 wherein the reservoir is adapted to receive a liquid at a temperature below 0° C. for lowering the temperature of the specimen.

5. Apparatus as claimed in claim 1 wherein the means for resisting the torque of the support member comprises a spiral spring movable at its one end with the support member and secured at its other end to a fixed part of the apparatus.

6. Apparatus as claimed in claim 1 wherein the means for measuring the rotational deflection of the support member comprises a calibrated scale movable with the support member and movable relative to a fixed datum member.

7. Apparatus as claimed in claim 1 wherein the means for measuring the resisting torque of the support member comprises a fixed electrical potentiometer and a contact arm movable with the support member relative to the potentiometer for tapping-off an output potential from the potentiometer dependent upon the degree of rotation of the support member, the calibration of the potentiometer and its location relative to the support member being such that the potential tapped-off is proportional to the resisting torque.

8. Apparatus as claimed in claim 7 wherein the potentiometer is of annular form and the contact arm is movable circumferentially thereof.

9. Apparatus as claimed in claim 8 wherein the contact arm is resiliently biassed axially away from the potentiometer, clamping means being provided to press the contact arm into electrical contact with the potentiometer.

10. Apparatus as claimed in claim 9 wherein said clamping means comprises a clamping member movable into clamping engagement with the contact arm and one or more electrically-operated solenoids operably connected to the clamping member.

11. Apparatus as claimed in claim 1 wherein the support member comprises an annular steel plate secured to the base of the reservoir.

12. Apparatus as claimed in claim 1 wherein the track member comprises an annular steel plate having an annular grooved track formed therein.

13. Apparatus as claimed in claim 1 wherein the means for rotatably supporting the support member comprises a vertical shaft rotatably mounted in bearings at its upper and lower ends and the support member being fixedly secured to said shaft.

14. Apparatus as claimed in claim 1 wherein the track member, the balls, the support member and the reservoir are enclosed within the chamber, the base of which comprises a thermally insulating base member.

References Cited

UNITED STATES PATENTS

| | | | |
|---|---|---|---|
| 1,946,100 | 2/1934 | Norton. | |
| 2,779,187 | 1/1957 | Stewart | 73—9 |
| 2,867,113 | 1/1959 | Mims | 73—9 |
| 2,909,056 | 10/1959 | Neely | 73—10 |
| 3,178,928 | 4/1965 | Howe | 73—9 |

DAVID SCHONBERG, *Primary Examiner.*